Oct. 21, 1930.   C. B. HARP   1,778,942
DESILTING NOZZLE HEAD
Filed Aug. 20, 1928   2 Sheets-Sheet 1
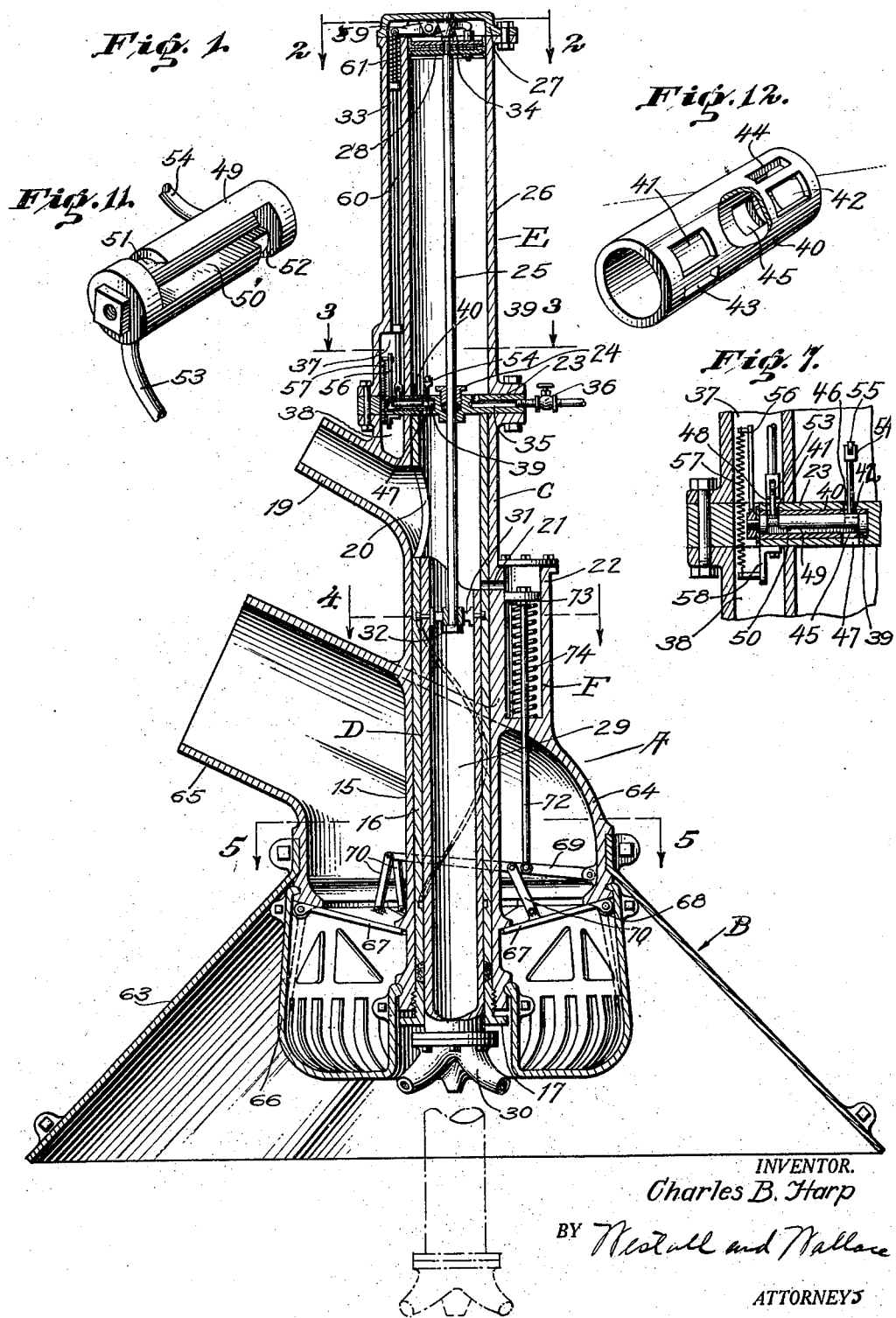
INVENTOR.
Charles B. Harp
BY Nestall and Wallace
ATTORNEYS Oct. 21, 1930.          C. B. HARP          1,778,942
DESILTING NOZZLE HEAD
Filed Aug. 20, 1928          2 Sheets-Sheet 2
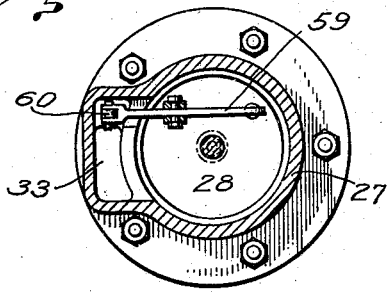
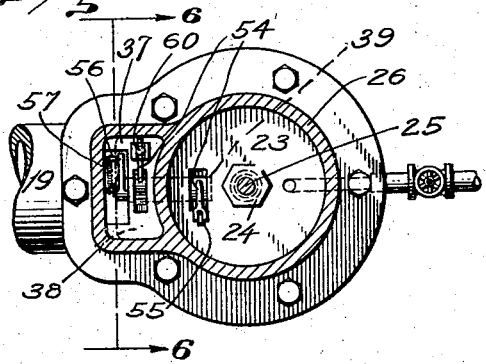
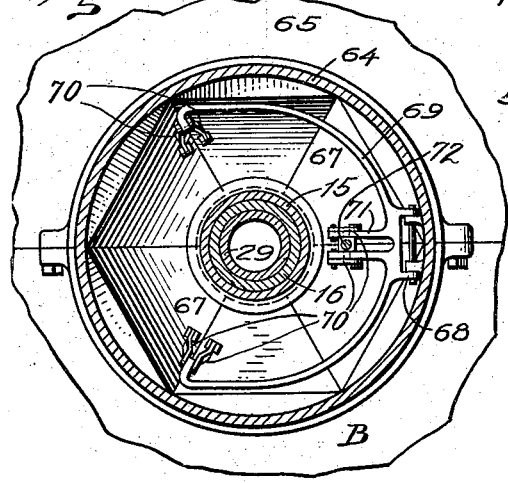
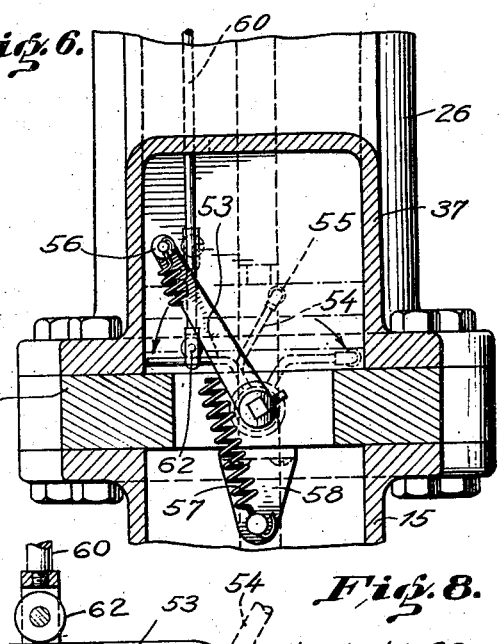
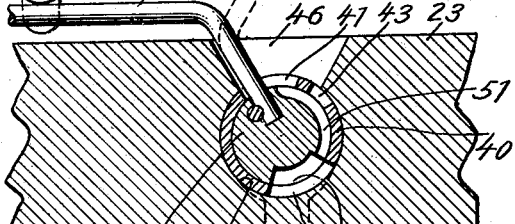
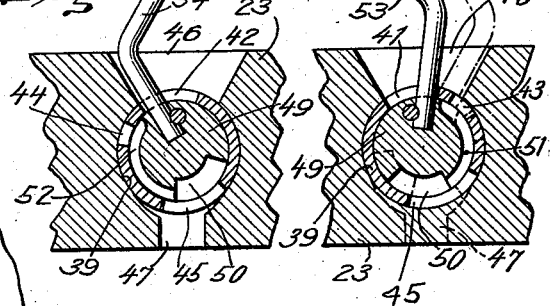
INVENTOR.
Charles B. Harp
BY Nestall and Wallace
ATTORNEYS Patented Oct. 21, 1930

1,778,942

UNITED STATES PATENT OFFICE

CHARLES B. HARP, OF LOS ANGELES, CALIFORNIA

DESILTING NOZZLE HEAD

Application filed August 20, 1928. Serial No. 300,623.

This invention relates to a device for agitating solids, such as silt, sand, dirt or the like, settled at the bed of bodies of liquid. Hereinafter, the term silt is used in a sense inclusive of such solids as above mentioned. The present invention is especially adapted for agitating such solids and causing them to be suspended in the liquid, whereby they may be removed by causing a flow of the silt carrying liquids or taking advantage of a natural flow which carries such liquid with suspended solids to a place at which it is desired to deposit them. The present invention has a particular field of utility in the desilting of rivers, canals, water basins or the like wherein there is a natural flow and the silt carrying water flows to a point or place at which the silt is to be deposited. It also has a particular field of utility in desilting of beds wherein an artificial flow of the silt carrying liquid is created and the body of silt carrying liquid is separated and carried through conduits to a silt receiving place. There are various other uses to which the invention may be applied, and will be apparent from the subjoined specification.

It is the primary object of this invention to provide a nozzle for projecting fluid, which nozzle is reciprocable and oscillatable with respect to its support whereby it may be projected and retracted with respect to the bed of silt. Another object of this invention is to provide a nozzle of the character described which is fluid operated and is actuated by the pressure of the fluid projected through the nozzle. A further object of this invention is to provide details of construction for such a nozzle.

These objects together with other objects and corresponding accomplishments are obtained by means of the embodiments of my invention illustrated in the accompanying drawing, in which :—

Fig. 1 is a longitudinal section through a nozzle equipped with means for withdrawing the silt carrying liquid; Figs. 2 to 5 inclusive are sections as seen on the lines correspondingly numbered in Fig. 1; Fig. 6 is a section on an enlarged scale as seen on the line 6—6 of Fig. 3; Fig. 7 is an enlarged view of a fragment of the structure shown in Fig. 1 showing details of the valve; Figs. 8, 9 and 10 are sections transverse of the valve; Fig. 11 is a perspective view of the valve plug; and Fig. 12 is a perspective view of the valve sleeve.

Referring more particularly to the drawing and especially Fig. 1, A indicates a body having a chamber adapted to be connected to a suction line for withdrawal of silt carrying liquid. It is provided with a hood B serving as an intake for the silt carrying liquid. Projecting upwardly from the body and forming a part thereof is a tubular guide C adapted to be connected to a source of fluid under pressure. Reciprocably mounted within the guide is a tubular member D carrying a nozzle head. The guide member is extended to mount the cylinder of a fluid operated motor E for actuating the nozzle member to cause it to be reciprocated longitudinally and oscillated about its axis. The intake chamber is controlled by a valve mechanism including a fluid operated motor F. The valve at the intake is normally closed but is adapted upon fluid pressure being introduced to the nozzle to open the latter.

The guide 15 is of tubular form having a liner 16 and is provided with a packing gland 17. Spiral grooves or ways 18 extend around the liner on its inner wall. An inlet 19 is provided in the guide and its port registers with a corresponding port 20 in the liner. A port 21 is also provided in the guide and registers with a corresponding opening in the liner. The port 21 communicates with the chamber in a cylinder 22 formed upon the body. The tubular guide is closed by a head 23 serving as a valve housing and has a stuffing box 24 therein through which extends a piston rod 25.

Mounted upon the head is a motor cylinder 26 closed by a head 27. A piston 28 is reciprocably mounted in the motor cylinder and is secured to the rod 25. Reciprocably mounted within the guide is a tubular nozzle member 29 having a nozzle head 30 secured thereto for the projection of fluid. A cross member 31 is secured within the tubular member 29 by means of pins which are disposed in the spiral slots 18. The piston rod 25 is swivelled in the cross member 31, so that the tubular member can oscillate about the piston rod. The cross member and piston rod are so connected that the piston rod may slide downwardly through the cross member, but the head 32 thereon will abut the cross member upon its upward movement, thereby providing a swivel and a one-way connection between the nozzle member and the piston rod. The motor cylinder 26 has a passageway 33 formed at one side thereof and extending the length of the cylinder communicating with the space in the head 27 above the piston. In the head 27 is a relief port 34, and in the head 23 is a passage 35 connected to a valve 36. Passage 35 is a relief port and may be controlled by the valve 36. It is obvious, that the port 34 likewise could be connected to a valve in a like manner. The bottom of the passageway 33 is enlarged to form a valve mechanism chamber 37, and a corresponding enlargement is formed on the side of the guide as indicated by 38. A bore 39 extends from one side of the head to a point adjacent the stuffing box and receives a valve plug and sleeve. The sleeve indicated by 40 has openings 41 and 42 to accommodate arms secured to the valve plug. At one side of the opening 41 is a port opening 43 and at the opposite side of the opening 42 is a port opening 44. Diametrically opposite to opening 42 is an inlet port opening 45. In the head and communicating with the bore 39 is a port 46. Opposite the port 46 and communicating with the bore 39 is a port 47 opening to the lower side of the head. A port 48 opens to the chamber 37 and is disposed for registration with the port 43 in the sleeve. A valve plug 49 is rotatably mounted in the sleeve and has a longitudinally extending channel 50 with peripherally extending end portions 51 and 52. Secured to the plug and extending laterally therefrom is an operating arm 53. In assembled relation of the sleeve and plug within the head, the operating arm extends through the port opening 48 in the head and the opening 41 in the sleeve. An arm 54 is connected to the plug at the opposite end and extends through the opening 42 in the sleeve and the port 46 in the head. Arm 54 has journalled upon its end a roller 55. Secured to the end of the plug is a snap-over arm 56 to which a tension spring 57 is secured, the other end of the tension spring being connected to a bracket 58 mounted upon the head 23. The snap-over mechanism is intended to move the plug from its intermediate position to either limit thereof.

Referring to Figs. 8, 9 and 10, it will be noted that the sleeve opening 45 will always be in registration with the port 47. If the valve plug is in the position shown in Figs. 8 and 9, fluid may pass through the port 47 and the sleeve to the channel 50, thence to end portion, through 51, opening 43 in the sleeve, and through the port 48 to the chamber 37. It may then move upwardly through the chamber 33 and act upon the upper side of the piston. Movement of the arm 53 to its opposite position as shown in Fig. 10 will cause the sleeve 40 to be moved so as to close port 43. When the plug is in the position shown in Figs. 8 and 9, port 44 in the sleeve will be closed, thereby shutting off the port 46 from communication with port 47. In the position shown in Fig. 10 in dotted lines, port 44 will have been moved into registration with port 46 thereby placing port 47 in communication with port 46. Thus, by swinging the arms to one limit of their position, the space below the head 23 will be placed in communication with the space in the motor cylinder below the piston. In the other extreme position of the valve plug, the space below the head 23 will be placed in communication with the chamber 37 and through the intermediate passages with the space above the piston 28. The sleeve 40 should have such frictional engagement with the walls of the bore, that the plug 49 in its rotation will not cause the sleeve to follow. Thus, the arms 53 and 54 effect movement of the sleeve by engaging the side walls of the openings 41 and 42. This non-dragging effect of the plug on the sleeve may also be obtained by adding a braking device so as to engage the sleeve.

To operate the arm 53, a lever 59 is pivotally mounted intermediate its ends upon the head 27. One end is disposed to be engaged by the piston 28 at the upper limit of its travel and the other end is pivotally secured to a push rod 60. A compression spring 61 mounted upon a ledge tends to hold the push rod in upper position. At the lower end of the push rod is a roller 62 disposed to engage the arm 53.

Fluid under pressure, such as water, or a gaseous fluid such as air is supplied to the intake 19 and to the nozzle. Assuming that the nozzle is in upper position as shown in Fig. 1, there is a pressure upon the nozzle head tending to move the nozzle outwardly of the guide. The valve is then in the position shown in Figs. 8 and 9 so that fluid may pass from the lower side of head 23 into the chamber 37 and upwardly through the passage 33 to the upper side of the piston. The relief port 34 is of such size that fluid will enter the cylinder above the piston faster than it will pass out of the relief port. This causes a pressure upon the piston and the latter moves downwardly following the nozzle. If the nozzle strikes an obstruction the piston can continue its movement due to the one way connection with the nozzle and finally will reach the lower end of its travel, whereupon it engages the arm 54. This causes the valve plug and sleeve to be swung to its opposite position, and communication is shut off between the source of fluid supply and the chamber 37. At the same time fluid is admitted to the cylinder on the lower side of piston 28 and the latter is caused to travel upwardly retracting the nozzle. Fluid enters the cylinder faster than escape through relief valve 36. This reciprocatory movement is continued during the time that fluid under pressure is supplied to the nozzle. Upon the downward movement of the nozzle, it is caused to turn in one direction and upon its return movement in the reverse direction due to the spiral ways and the pins.

The inlet hood 63 is connected to the body 64, there being a chamber formed thereby having an outlet 65 adapted to be connected to suction apparatus. The nozzle causes agitation of the silt and a suspension in the liquid. This liquid is then drawn through the chamber 64 and outlet 65. Secured to the body 64 and to the guide 15 is a grating member 66 to prevent rocks and like large solids from being drawn into the suction chamber. Valve seats are formed at the ends or mouth of the suction chamber, and sectional flap valves 67 are pivotally mounted as indicated by 68. These valve flaps open outwardly, so that there is a tendency for the valve to close against the intake of liquid. A yoke 69 is pivotally secured to body 64, the arms thereof extending around the guide and being secured to the flaps by links 70. A center arm 71 has a piston stem 72 secured thereto, which extends into the cylinder 22, and is provided with a piston 73. Below the piston 73 is a compression spring 74 tending to hold the piston in its upper position with the valve flaps closed. Upon fluid under pressure being supplied to the nozzle, fluid passes through the port 21 above the piston 73 and acts upon the latter to move it downwardly against the action of spring 74 and the action of the liquid tending to close the valve flaps. Immediately upon release of this pressure, the spring 74 acts to close the valve flaps. It is thus seen that upon the introduction of fluid under pressure, the valve flaps 67 are opened and the nozzle is reciprocated and oscillated. The silt is thus stirred into the liquid and the silt carrying liquid is drawn into the suction chamber and delivered to a point of discharge. Obviously, the nozzle may be used without the suction device to cause stirring up silt and water so as to bring the silt into suspension, and the mixture may be carried away in any manner desired such as by natural flow of a stream.

What I claim is:—

1. A nozzle comprising a guide, a tubular member reciprocably supported in said guide and communicating with a source of fluid supply, a head on said tubular member having outlets for the projection of fluid therefrom, and fluid operated means to longitudinally reciprocate said tubular member and oscillate the latter about its axis.

2. A nozzle comprising a guide, a tubular member reciprocably supported in said guide and communicating with a source of fluid supply, a head on said tubular member having outlets for the projection of fluid therefrom, and fluid operated means connected to said source of supply for reciprocating said tubular member.

3. A nozzle comprising a guide, a tubular member reciprocably supported in said guide and communicating with a source of fluid supply, a head on said tubular member having outlets for the projection of fluid therefrom and fluid operated means connected to said source of supply to longitudinally reciprocate said tubular member and oscillate the latter about its axis.

4. A nozzle comprising a guide, a tubular member reciprocably supported in said guide and communicating with a source of fluid supply, a head having outlets for the projection of fluid therefrom, a fluid operated motor connected to said tubular member to reciprocate the latter and valve means operable by said motor to automatically control operation thereof.

5. A nozzle comprising a guide, a tubular member reciprocably supported in said guide and communicating with a source of fluid supply, a head on said tubular member having outlets for the projection of fluid therefrom, a fluid operated motor connected to said tubular member to reciprocate the latter, valve means operable by said motor to automatically control operation thereof, and means connecting said guide member and tubular member to cause oscillation of the latter about its axis upon reciprocation of said tubular member.

6. A nozzle comprising a guide, a tubular member reciprocably supported in said guide and communicating with a source of fluid supply, a head on said tubular member having outlets for the projection of fluid therefrom, a fluid operated motor connected to said tubular member having a reciprocable piston connected to said tubular member, a spiral way and key connecting said tubular member and guide to cause oscillation of said tubular member about its axis upon the reciprocation thereof, and valve means operable by said motor to automatically control operation thereof.

7. A nozzle comprising a guide, a tubular member reciprocably supported in said guide and communicating with a source of fluid supply, a nozzle head on said tubular member having outlets for the projection of fluid therefrom, means to reciprocate said tubular member, and an intake hood for silt carrying liquid disposed around said tubular member and having its mouth adjacent said head.

8. A nozzle comprising a guide, a tubular member reciprocably supported in said guide and communicating with a source of fluid supply, a head on said tubular member having outlets for the projection of fluid therefrom, means to longitudinally reciprocate said tubular member and oscillate the latter about its axis, and an intake hood for silt carrying liquid disposed around said tubular member and having its mouth adjacent said head.

9. A nozzle comprising a guide, a tubular member reciprocably supported in said guide and communicating with a source of fluid supply, a head on said tubular member having outlets for the projection of fluid therefrom, fluid operated means connected to said source of supply for reciprocating said tubular member, and an intake hood for silt carrying liquid disposed around said tubular member and having its mouth adjacent said head.

10. A nozzle comprising a guide, a tubular member reciprocably supported in said guide and communicating with a source of fluid supply, a head on said tubular member having outlets for the projection of fluid therefrom, fluid operated means connected to said source of supply to longitudinally reciprocate said tubular member and oscillate the latter about its axis, and an intake hood for silt carrying liquid disposed around said tubular member and having its mouth adjacent said head.

11. A nozzle comprising a guide, a tubular member reciprocably supported in said guide and communicating with a source of fluid supply, a head having outlets for the projection of fluid therefrom, a fluid operated motor connected to said tubular member to reciprocate the latter, valve means actuable by said motor to automatically control operation thereof, and an intake hood for silt carrying liquid disposed around said tubular member and having its mouth adjacent said head.

12. A nozzle comprising a guide, a tubular member reciprocably supported in said guide and communicating with a source of fluid supply, a head on said tubular member having outlets for the projection of fluid therefrom, a fluid operated motor connected to said tubular member to reciprocate the latter, valve means actuable by said motor to automatically control operation thereof, means connecting said guide member and tubular member to cause oscillation of the latter about its axis upon reciprocation of said tubular member, and an intake hood for silt carrying liquid disposed around said tubular member and having its mouth adjacent said head.

13. A nozzle comprising a guide, a tubular member reciprocably supported in said guide and communicating with a source of fluid supply, a head on said tubular member having outlets for the projection of fluid therefrom, a fluid operated motor connected to said tubular member having a reciprocable piston connected to said tubular member, a spiral way and key connecting said tubular member and guide to cause oscillation of said tubular member about its axis upon the reciprocation thereof, valve means operable by said motor to automatically control operation thereof, and an intake hood for silt carrying liquid disposed around said tubular member and having its mouth adjacent said head.

14. A nozzle comprising a guide, a tubular member reciprocably supported in said guide and communicating with a source of fluid supply, a head on said tubular member having outlets for the projection of fluid therefrom, fluid operated means connected to said source of supply for reciprocating said tubular member, an intake hood for silt carrying liquid disposed around said tubular member and having its mouth adjacent said head, valve means for said hood, means tending to hold said valve means in closed position, a fluid operated motor connected to said source of supply and actuable thereby to open said valve means.

15. A nozzle comprising a guide, a tubular member reciprocably supported in said guide and communicating with a source of fluid supply, a head on said tubular member having outlets for the projection of fluid therefrom, fluid operated means connected to said source of supply to longitudinally reciprocate said tubular member, an intake hood for silt carrying liquid disposed around said tubular member and having its mouth adjacent said head, valve means for said hood, spring means tending to hold said valve means closed, a valve operating motor including a cylinder connected to said source of supply, a piston therein, and linkage connecting said piston and valve means whereby said piston is actuable by the fluid from said source of supply to cause said valve means to be opened.

16. A nozzle comprising a guide, a tubular member reciprocably supported in said guide and communicating with a source of fluid supply, a head on said tubular member having outlets for the projection of fluid therefrom, a fluid operated motor for reciprocating said tubular member including a cylinder, a piston therein connected to said tubular member, passages connecting said source of supply and said cylinder, a valve controlling the flow of fluid from said source of supply to said working motor and means operated by said piston at the limits of its travel to actuate said valve.

17. A nozzle comprising a guide, a tubular member reciprocably supported in said guide and communicating with a source of fluid supply, a head having outlets for the projection of fluid therefrom, a fluid operated motor including a reciprocable piston connected to said tubular member to reciprocate the latter, valve means actuable by said motor to automatically control operation thereof, and valve mechanism for operating said valve actuated by said piston at the limits of its travel.

18. A nozzle comprising a guide, a tubular member reciprocably supported in said guide and communicating with a source of fluid supply, a head on said tubular member having outlets for the projection of fluid therefrom, a fluid operated motor connected to said tubular member having a reciprocable piston, a piston rod connected to said tubular member by a one-way coupling, a spiral way and key connecting said tubular member and guide to cause oscillation of said tubular member about its axis upon the reciprocation thereof, a valve operable by said motor to automatically control operation thereof, and valve mechanism for operating said valve actuated by said piston at the limits of its travel.

19. A nozzle comprising a guide, a tubular member reciprocably supported in said guide and communicating with a source of fluid supply, a head on said tubular member having outlets for the projection of fluid therefrom, a fluid operated motor connected to said tubular member having a reciprocable piston, a piston rod connected to said tubular member by a one-way coupling, a spiral way and key connecting said tubular member and guide to cause oscillation of said tubular member about its axis upon the reciprocation thereof, a valve operable by said motor to automatically control operation thereof, and valve mechanism for operating said valve actuated by said piston at the end of its travel.

In witness that I claim the foregoing I have hereunto subscribed my name this 14th day of August, 1928.

CHARLES B. HARP.